US006647181B2

(12) United States Patent
Jang

(10) Patent No.: US 6,647,181 B2
(45) Date of Patent: Nov. 11, 2003

(54) LONG PERIOD FIBER GRATING PACKAGE

(75) Inventor: Joo-Nyung Jang, Yongin-shi (KR)

(73) Assignee: Samsung Electronics Co. Ltd, Suwon (KR)

( * ) Notice: Subject to any disclaimer, the term of this patent is extended or adjusted under 35 U.S.C. 154(b) by 0 days.

(21) Appl. No.: 09/942,243

(22) Filed: Aug. 29, 2001

(65) Prior Publication Data

US 2002/0025118 A1 Feb. 28, 2002

(30) Foreign Application Priority Data

Aug. 29, 2000 (KR) .......................... 2000-50504

(51) Int. Cl.[7] .......................... G02B 6/34; G02B 6/255; G02B 6/02; G02B 6/22
(52) U.S. Cl. .......................... 385/37; 385/99; 385/128; 385/123
(58) Field of Search .......................... 385/37, 99, 128

(56) References Cited

U.S. PATENT DOCUMENTS

| 5,620,495 | A | * | 4/1997 | Aspell et al. ............... 385/123 |
| 5,991,483 | A | * | 11/1999 | Engelberth .................. 385/137 |
| 6,011,886 | A | * | 1/2000 | Abramov et al. ............ 385/123 |
| 6,204,304 | B1 | * | 3/2001 | Houlihan et al. ............ 359/566 |
| 6,222,973 | B1 | * | 4/2001 | Starodubov .................. 385/126 |
| 6,269,207 | B1 | * | 7/2001 | Carberry et al. ............. 385/123 |
| 6,273,621 | B1 | * | 8/2001 | Eslambolchi et al. ........ 385/135 |
| 2001/0028763 | A1 | * | 10/2001 | Carberry et al. ............. 385/37 |
| 2002/0154860 | A1 | * | 10/2002 | Fernald et al. ................ 385/37 |

* cited by examiner

Primary Examiner—Brian Healy
Assistant Examiner—Tina M Lin
(74) Attorney, Agent, or Firm—Cha & Reiter

(57) ABSTRACT

There is provided a package for holding long-period fiber gratings formed on an optical fiber from which an outer coating is partially removed to form the gratings thereon. A recoating is then applied to the long-period fiber gratings to maintain the optical characteristics of the long-period fiber gratings, and thereafter a silica glass tube is fixed around the recoating to protect the long-period fiber gratings from an ambient environment.

13 Claims, 2 Drawing Sheets

US 6,647,181 B2

LONG PERIOD FIBER GRATING PACKAGE

CLAIM OF PRIORITY

This application makes reference to and claims all benefits accruing under 35 U.S.C. Section 119 from an application entitled "Long Period Fiber Grating Package" filed in the Korean Industrial Property Office on Aug. 29, 2000 and there duly assigned Ser. No. 2000-50504.

BACKGROUND OF THE INVENTION

1. Field of the Invention

The present invention relates generally to packaging of long-period fiber gratings and, in particular, to a long-period fiber grating package that is packaged such that its reflection wavelength is temperature-independent.

2. Description of the Related Art

Fiber gratings are well known in optical fiber communication systems. The function of a fiber grating is to selectively remove or reflect light at a specific wavelength, by inducing a periodic change in the refractive index of the fiber using a UV (Ultra Violet) laser. In contrast, a long-period fiber grating with a periodic spacing, which is typically in the hundreds of micrometers, can be used as a gain flattening filter for an EDFA (Erbium Doped Fiber Amplifier) as it removes light at a specific wavelength by mode conversion. That is, long-period grating removes light without reflection by coupling light from a core mode (or guided mode) to a cladding mode (or non-guided mode). Hence, the central wavelength and the extinction ratio of the long-period fiber gratings are determined by mode coupling between the core mode and the cladding mode. However, long-period gratings exhibit high temperature sensitivity.

To eliminate the influence on the refractive index change by ambient temperatures, a double cladding technique has been employed to reduce the temperature sensitivity. That is, an additional cladding is applied on the outer surface of a primary cladding to be temperature-independent. However, protection of wavelengths against temperature change requires the difficult task of accurately controlling the refractive index distribution and the amount of dopant concentration in the fiber. Therefore, there is a need for a temperature compensating package used to stabilize the temperature sensitivity of long-period gratings.

SUMMARY OF THE INVENTION

The present invention provides a long-period fiber grating package that ensures the usage of long-period gratings without temperature control.

According to an aspect of the present invention, there is provided along-period package that protects fiber gratings against ambient influences, such as moisture. The inventive package for holding long-period fiber gratings is partially removed to which a recoating is applied thereto in order to stabilize the optical characteristics of the long-period fiber gratings. Thereafter, a silica glass tube is fixed around the recoating to protect the long-period fiber gratings from an ambient environment.

According to another aspect of the invention, there is provided a method of packaging long-period fiber gratings and includes the following steps: providing an optical fiber comprising a core and a cladding; removing a section of the cladding along the fiber; transmitting light passing through an amplitude mask to form the long-period fiber gratings into the removed section of the fiber; forming a recoating layer around the removed section of the fiber to maintain optical characteristics thereon; inserting a silica glass tube around the recoating layer for protecting the long-period fiber gratings from ambient environment; and, inserting a protective layer around the silica glass tube for protecting against external stresses.

BRIEF DESCRIPTION OF THE DRAWINGS

The above and other features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. For the purposes of clarity and simplicity, well-known functions or constructions are not described in detail as they would obscure the invention in unnecessary detail.

Figure 1:
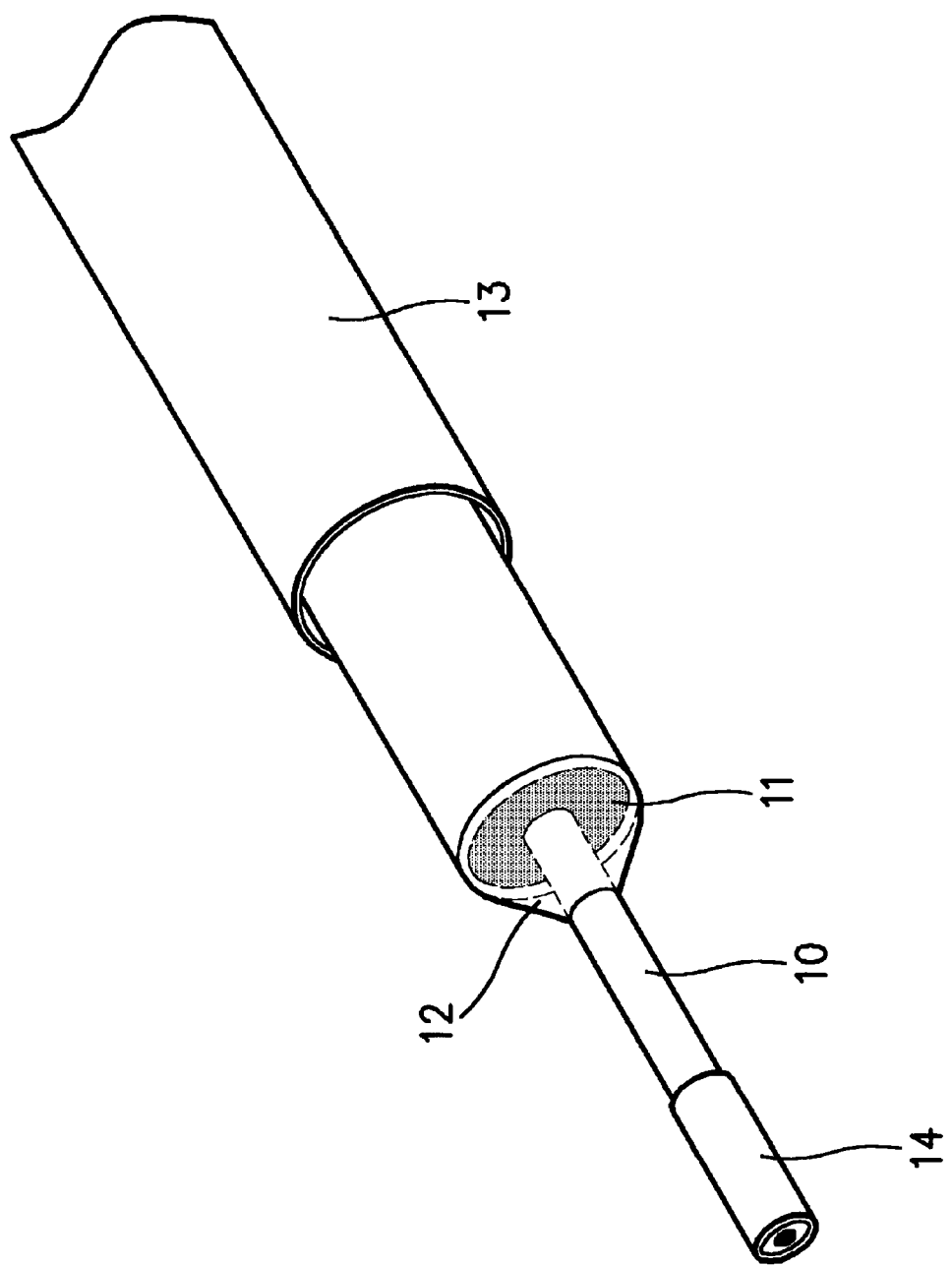
FIG. 1 is a perspective view of a long-period fiber grating package according to an embodiment of the present invention; and, FIG. 2 is a sectional view of the long-period fiber grating package according to an embodiment of the present invention.
Figure 2:
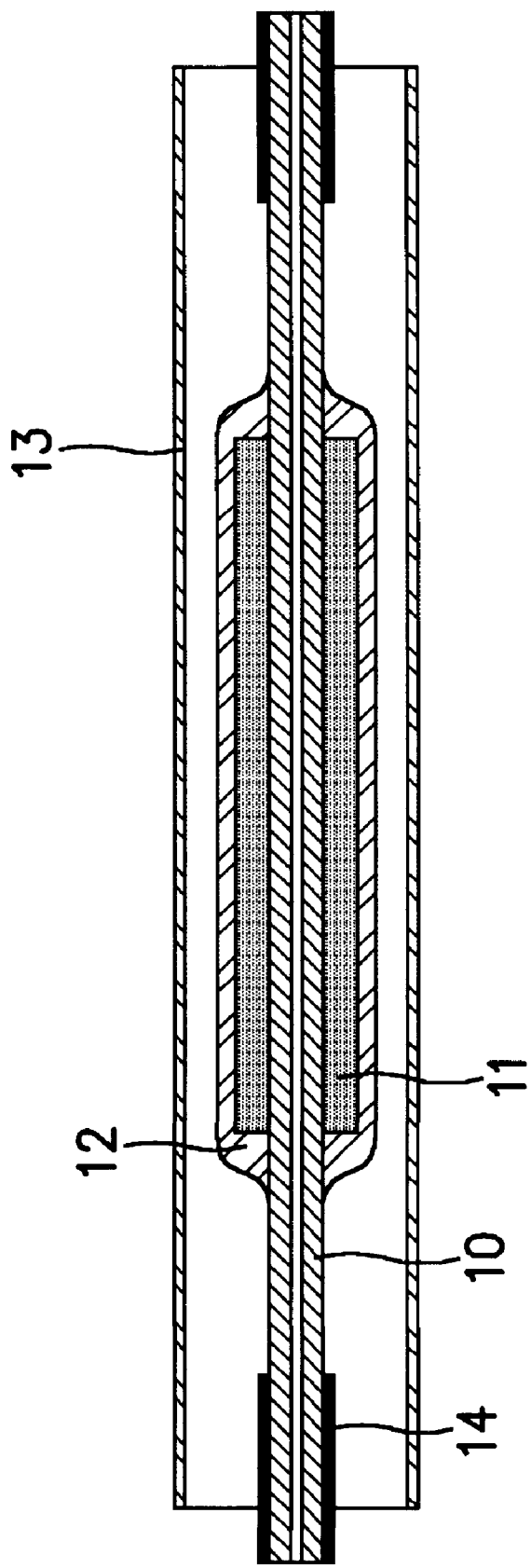

FIGS. 1 and 2 schematically depict an exemplary embodiment of the present invention in which a long-period fiber grating is packaged such that it protects the long-period fiber gratings, which are formed on a portion of an optical fiber 10 by removing the outer coating 14 therefrom and exposing the optical fiber to UV laser via an amplitude mask. A recoating 11 is applied to the grating portion to maintain the optical characteristics of the long-period fiber gratings. Then, a silica glass tube 12 is fixed around the recoating 11 to protect the long-period fiber gratings from the ambient environment.

Now, a method of providing the inventive package, as explained in the preceding paragraph is explained hereinafter.

Initially, the long-period fiber gratings are formed along the optical fiber 10 using a UV laser. The light is passed through an amplitude mask and onto the fiber 10 after the coating 14 of the optical fiber 10 is partially removed. It should be noted that inducing a plurality of refractive index perturbations that are spaced along the fiber 10 by a periodic distance is well known in the art that can be performed in a variety of ways. Thereafter, the long-period fiber gratings can be inserted into a fixing tube with an insertion groove (not shown). A preferred material for the fixing tube is formed of a silica material that has the same thermal expansion coefficient as that of the fiber gratings. The grating portion is inserted through the insertion groove formed in the fixing tube, then the recoating 11 is applied thereto. The recoating 11 is a gel type silicon material, such as silicon resin. The silicon material serves to protect the fiber gratings from external stresses when it is hardened. Such external stresses, for example, could be external impact or a pressure from outside of a cable against the fiber gratings, and the recoating acts as a sponge to absorb the impact and pressure to prevent damage to the fiber gratings.

Thereafter, the silica glass tube 12 is applied around the outer surface of the recoating 11 to enable the long-period fiber gratings to protect the shift of the peak wavelength in an ambient environment, particularly to protect against moisture. Here, both ends of the glass tube 12 are closely fused to the cladding layer of the optical fiber 10 using an arc discharger, thereby preventing any introduction of external moisture.

Finally, a protection tube 13 is fixed around the outermost circumferential surface of the optical fiber 10 to cover the recoating 11 and the silica glass tube 12. The protection tube 13 can be a metal tube, more preferably, a stainless steel tube. The protection tube 13 protects the glass tube 12, as well as the fiber 10, from impact stresses. A predetermined adhesive (not shown) can be applied to both ends of the optical fiber 10 to bond the outer coating 14 with the protection tube 13. This prevents the coating 14 from sliding along the optical fiber 10 due to external stresses, thus stabilizing the optical characteristics of the long fiber from changes due to external stresses.

As described above, the long-period fiber grating package according to the present invention fixes a silica glass tube around the recoating of long-period fiber gratings to protect the fiber gratings against environmental changes, thus stabilizing long-period gratings.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. A package comprising an optical fiber having a core and cladding and a plurality of refractive index gratings formed along a portion of the core, where a portion of the cladding covering the plurality of said refractive index gratings is removed, comprising:

a recoating layer covering the plurality of said refractive index gratings for maintaining optical characteristics thereon;

a silica glass tube surrounding said recoating layer for protecting the plurality of said refractive index gratings from ambient environment; and a protective layer surrounding and directly adjacent an exterior surface of said silica glass tube for protecting said silica glass tube from stress impact and said recoating layer.

2. The package of claim 1, wherein said protective layer is a stainless steel tube.

3. The package of claim 1, wherein said recoating layer is made of silicon resin.

4. The package of claim 1, wherein both ends of said silica glass tube are fused on the cladding of said optical fiber using arc discharger.

5. A device for holding long-period fiber gratings comprising:

an optical fiber comprising a core and a cladding, said optical having a section from which the cladding is removed to form said fiber gratings thereon;

a recoating layer covering the plurality of said refractive index gratings for maintaining optical characteristics thereon;

a silica glass tube surrounding said recoating layer for protecting the plurality of said refractive index gratings from ambient environment; and, a protective layer surrounding and directly adjacent an exterior surface of said silica glass tube for protecting said silica glass tube from stress impact and said recoating layer.

6. The package of claim 5, wherein said protective layer is a stainless steel tube.

7. The package of claim 5, wherein said recoating layer is made of silicon resin.

8. The package of claim 5, wherein both ends of said silica glass tube are fused on the cladding of said optical fiber using arc discharger.

9. A method for packaging long-period fiber gratings, the method comprising the steps of:

providing an optical fiber comprising a core and a cladding;

removing a section of said cladding along said optical fiber;

transmitting light passing through an amplitude mask to form said long-period fiber gratings onto said removed section;

forming a recoating layer around said removed section to maintain optical characteristics thereon;

inserting a silica glass tube around said recoating layer for protecting the plurality of said refractive index gratings from ambient environment; and, inserting a protective layer around and directly adjacent an exterior surface of said silica glass tube for protecting said silica glass tube from stress impact and said recoating layer.

10. The method of claim 9, wherein the step of forming said recoating layer comprises the steps of:

inserting said long-period fiber gratings into a tube; and filling a silica material into said tube to form said recoating layer, said silica material having the same thermal expansion coefficient as said long-period fiber gratings.

11. The method of claim 9, wherein said protective layer is a stainless steel tube.

12. The package of claim 9, wherein said recoating layer is made of silicon resin.

13. The package of claim 9, wherein both ends of said silica glass tube are fused on said cladding of said optical fiber using arc discharger.

* * * * *